(12) United States Patent
Sakamoto et al.

(10) Patent No.: US 9,832,624 B2
(45) Date of Patent: Nov. 28, 2017

(54) INFORMATION PROCESSING METHOD, INFORMATION PROCESSING DEVICE, AND STORAGE MEDIUM

(71) Applicant: FUJITSU LIMITED, Kawasaki-shi, Kanagawa (JP)

(72) Inventors: Takuya Sakamoto, Kawasaki (JP); Koichi Yasaki, Kawasaki (JP); Hidenobu Ito, Kawasaki (JP); Yosuke Nakamura, Kawasaki (JP); Junya Kani, Kawasaki (JP); Kazuaki Nimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/981,884

(22) Filed: Dec. 28, 2015

(65) Prior Publication Data

US 2016/0198323 A1 Jul. 7, 2016

(30) Foreign Application Priority Data

Jan. 7, 2015 (JP) .................................. 2015-001586

(51) Int. Cl.
*G06F 9/445* (2006.01)
*H04M 1/725* (2006.01)
(Continued)

(52) U.S. Cl.
CPC ............. *H04W 4/20* (2013.01); *G06F 9/4411* (2013.01); *H04M 1/72525* (2013.01); *H04M 1/72527* (2013.01)

(58) Field of Classification Search
CPC ... H04W 4/20; H04W 76/02; H04M 1/72523; H04M 1/725; G06F 9/445
See application file for complete search history.

(56) References Cited

U.S. PATENT DOCUMENTS 5,794,032 A * 8/1998 Leyda ................... G06F 9/4411
713/100
6,023,585 A * 2/2000 Perlman ................ G06F 9/4415
717/178

(Continued)

FOREIGN PATENT DOCUMENTS

JP 2009-211729 9/2009
JP 2012-216162 11/2012
JP 2012-216163 11/2012

*Primary Examiner* — Blane Jackson
(74) *Attorney, Agent, or Firm* — Fujitsu Patent Center

(57) ABSTRACT

An information processing method including: starting, by an information processing device, an application program designating a peripheral device type of a plurality of peripheral device types, each of the plurality of peripheral device types corresponding to each peripheral device set, the application program utilizing a specified peripheral device included in a specified peripheral device set to which the designated peripheral device type corresponds, detecting at least one peripheral device that is configured to cooperate with the information processing device, determining the specified peripheral device of the designated peripheral device type, from among the detected at least one peripheral device, and obtaining a specified driver program for utilizing the determined specified peripheral device, wherein the application program utilizes the determined specified peripheral device based on the obtained specified driver program.

12 Claims, 12 Drawing Sheets

(51) Int. Cl.
*H04W 4/20* (2009.01)
*G06F 9/44* (2006.01)

(56) References Cited

U.S. PATENT DOCUMENTS

| | | | | |
|---|---|---|---|---|
| 6,178,468 B1* | 1/2001 | Rudd | ................... | G06F 9/4413 707/999.1 |
| 6,397,327 B1* | 5/2002 | Klebanov | ............. | G06F 9/4411 710/8 |
| 6,473,854 B1* | 10/2002 | Fleming, III | ......... | G06F 9/4413 713/1 |
| 7,062,261 B2* | 6/2006 | Goldstein | ......... | H04M 1/72525 455/419 |
| 7,600,227 B2* | 10/2009 | Brockway | ............. | G06F 9/4411 717/176 |
| 2002/0095501 A1 | 7/2002 | Chiloyan et al. | | |
| 2003/0114106 A1* | 6/2003 | Miyatsu | ................. | H04L 29/06 455/41.1 |
| 2005/0022212 A1* | 1/2005 | Bowen | ................. | G06F 9/4415 719/321 |
| 2012/0254352 A1 | 10/2012 | Ito et al. | | |
| 2015/0019616 A1 | 1/2015 | Ito et al. | | |

\* cited by examiner

FIG.7

| DEVICE TYPE | DISCOVERING INFORMATION |
|---|---|
| printer | ..., ..., ..., ..., ... |
| camera | ..., ..., ..., ..., ... |
| storage | ..., ..., ..., ..., ... |
| : | : |

FIG.8

| DISCOVERING INFORMATION | DRIVER URL |
|---|---|
| ... | http://xxxxxxxxx |
| ... | http://xxxxxxxxy |
| ... | http://xxxxxxxxz |
| : | : |

FIG.12

| APP ID | DEVICE ID | DEVICE TYPE | DRIVER NAME | USAGE TARGET |
|---|---|---|---|---|
| App0001 | 0x12345678 | printer | printerA | Yes |
| App0001 | 0x87654321 | printer | printerB | No |
| App0002 | 0x111111111 | ... | ... | Yes |

```
Common.getDriver('printer', function gotDriver(driver) {    — d41
  eval(driver);                                              — d42
});
```
d4

FIG.15

```
Common.discover('printer', function discovered(device_id) {   — d51
  Common.getDriver(device_id, gotDriver(driver) {             — d52
    eval(driver);                                             — d53
  });
});
```
d5

INFORMATION PROCESSING METHOD, INFORMATION PROCESSING DEVICE, AND STORAGE MEDIUM

CROSS-REFERENCE TO RELATED APPLICATION

This application is based upon and claims the benefit of priority of the prior Japanese Patent Application No. 2015-001586, filed on Jan. 7, 2015, the entire contents of which are incorporated herein by reference.

FIELD

The embodiments discussed herein are related to an information processing method such as cooperation method, an information processing device, and a storage medium.

BACKGROUND

Recently, wearable devices have been drawing attention, and many peripheral devices such as smart glasses, smart watches, and the like have become available. These peripheral devices are assumed to cooperate with a smart phone or the like, and include an application program interface (API) that can be called (or invoked) externally via radio communication such for example as Bluetooth (registered trademark) low energy (BLT), Wi-Fi (registered trademark) Direct, or the like.

On the other hand, when business is performed using an information processing terminal such as a smart phone or the like, application programs suitable for business on different occasions are used. Accordingly, from a viewpoint of convenience or a viewpoint of security, a technology has been proposed which determines an app for business use which app is suitable for an occasion in question from a context (location, time, or the like) of a user, and performs push distribution from a server (see Japanese Laid-open Patent Publication Nos. 2012-216163 and 2012-216162, for example).

SUMMARY

According to an aspect of the invention, an information processing method includes starting, by an information processing device, an application program designating a peripheral device type of a plurality of peripheral device types, each of the plurality of peripheral device types corresponding to each peripheral device set, the application program utilizing a specified peripheral device included in a specified peripheral device set to which the designated peripheral device type corresponds, detecting at least one peripheral device that is configured to cooperate with the information processing device, determining the specified peripheral device of the designated peripheral device type, from among the detected at least one peripheral device, and obtaining a specified driver program for utilizing the determined specified peripheral device, wherein the application program utilizes the determined specified peripheral device based on the obtained specified driver program.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of configuration of a discovering information storage unit;

FIG. 8 is a diagram illustrating an example of configuration of a driver management information storage unit;

FIG. 12 is a diagram illustrating an example of configuration of a correspondence information storage unit;

FIG. 14 is a diagram illustrating an example of definition contents of a common library in the second embodiment; and FIG. 15 is a diagram illustrating an example of definition contents of a common library in a third embodiment.

DESCRIPTION OF EMBODIMENTS

When an application program distributed according to a context of a user cooperates with a peripheral device, it suffices for the application program to call an API of the peripheral device.

However, APIs of respective peripheral devices are not necessarily the same. For example, even in a case of same printers, there is a possibility of different APIs when the models or the like of the printers are different from each other. Then, in a case where the context is evaluated according to a time period, for example, when a peripheral device that an application program distributed in a certain time period intends to use is different in model from a peripheral device present around an information processing terminal at a distribution destination of the application program in the time period, it is difficult for the user to use the application program effectively.

Accordingly, in one aspect, it is an object to improve flexibility related to cooperation between an application program of an information processing terminal and an external device.

Figure 1:
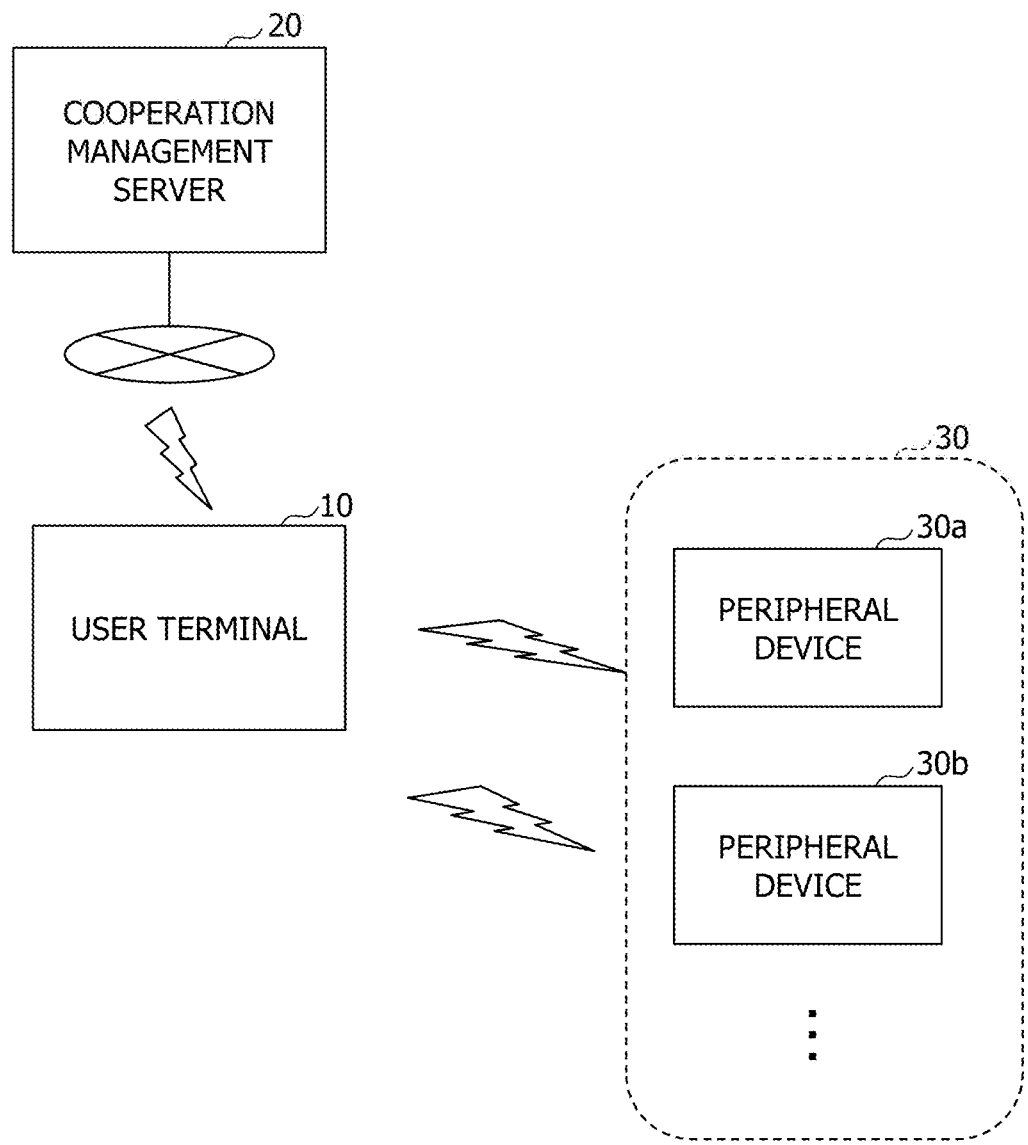
FIG. 1 is a diagram illustrating an example of a system configuration in a first embodiment.

Embodiments of the present technology will hereinafter be described with reference to the drawings. FIG. 1 is a diagram illustrating an example of a system configuration in a first embodiment. In FIG. 1, a cooperation management server 20 can communicate with one or more user terminals 10 via a radio communication such as a wireless local area network (LAN) or the like, a mobile communication network, or the like. In addition, a user terminal 10 can communicate with one or more peripheral devices 30 such as a peripheral device 30a and a peripheral device 30b or the like via a radio communication such as a wireless LAN or Bluetooth (registered trademark) or the like. Incidentally, for the convenience of description, suppose that the system configuration illustrated in FIG. 1 is constructed within a certain company (hereinafter referred to as a "company A").

The user terminal 10 is directly operated by a user. An example of the user terminal 10 is a smart terminal such as a smart phone, a tablet terminal, or the like. However, another kind of information processing terminal capable of radio communication, such as a personal computer (PC) or the like, may be used as the user terminal 10. In the present embodiment, the user terminal 10 performs processing in cooperation with the peripheral device 30 via a radio communication. Incidentally, the user of the user terminal 10 is for example an employee of the company A.

The peripheral device 30 is an example of an external device cooperating with the user terminal 10 (or being utilized by the user terminal 10) via the radio communication. For example a printer, a digital camera, a storage (storage device), a smart glass, a smart watch, or the like may be used as the peripheral device 30. Alternatively, a household electrical appliance such as an air conditioner or the like may be used as the peripheral device 30.

The cooperation management server 20 is a computer that distributes Web application programs (hereinafter referred to as "Web apps") corresponding to the contexts of users of respective user terminals 10 to the respective user terminals 10. A context is for example a concept indicating conditions in which the user is placed such as a present location, a present date and time, present weather, or the like, or the state or conditions of the user. Incidentally, the user terminal 10 is carried by the user. Hence, the context of the user can also be said to be the context of the user terminal 10. The cooperation management server 20 also manages information that may be necessary for the Web app distributed to each user terminal 10 to cooperate with the peripheral device 30 (access the peripheral device 30).

Incidentally, the Web apps are application programs including HTML, cascading style sheets (CSS), JavaScript (registered trademark), and the like as constituent elements. For example, a Web app in the present embodiment may be a Web app in a Packaged Web Apps format (see http://www.w3.org/TR/widgets/).

Figure 2:
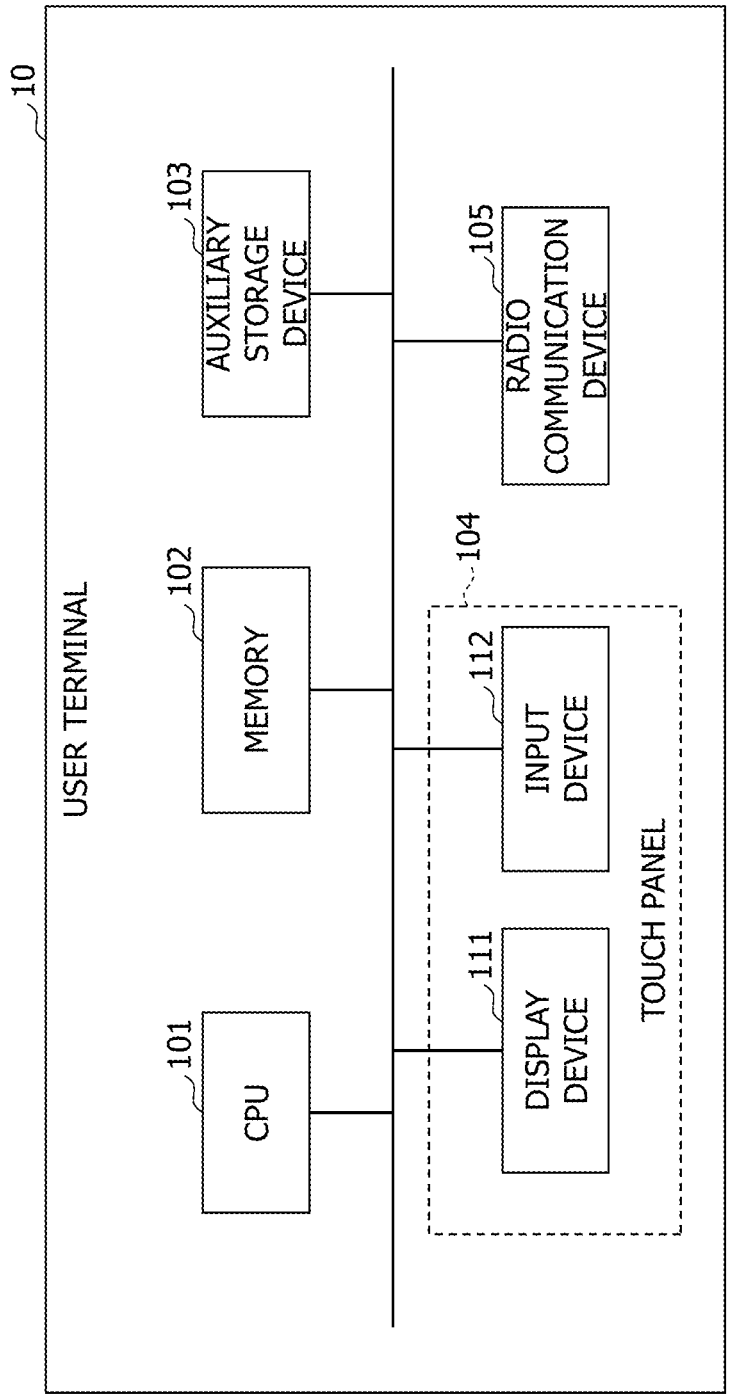
FIG. 2 is a diagram illustrating an example of hardware configuration of a user terminal in the first embodiment.

FIG. 2 is a diagram illustrating an example of hardware configuration of a user terminal in the first embodiment. The user terminal 10 in FIG. 2 includes a central processing unit (CPU) 101, a memory 102, an auxiliary storage device 103, a touch panel 104, a radio communication device 105, and the like.

The auxiliary storage device 103 stores a program installed in the user terminal 10 and the like. The memory 102 reads and stores the program from the auxiliary storage device 103 when an instruction to start the program is given. The CPU 101 implements functions of the user terminal 10 according to the program stored in the memory 102.

The touch panel 104 is an electronic part with both of an input function and a display function. The touch panel 104 displays information, and receives an input from the user, for example. The touch panel 104 includes a display device 111 and an input device 112 or the like.

The display device 111 is a liquid crystal display or the like. The display device 111 performs a display function of the touch panel 104. The input device 112 is an electronic part including a sensor that detects contact of an object in contact with the display device 111. A system of detecting the contact of the contact object may be any publicly known system such as an electrostatic system, a resistive film system, an optical system, or the like. Incidentally, the contact object refers to an object in contact with a contact surface (front surface) of the touch panel 104. An example of such an object is a finger of the user, a dedicated or ordinary pen, or the like. The radio communication device 105 is an electronic part which may be needed to perform radio communication.

Figure 3:
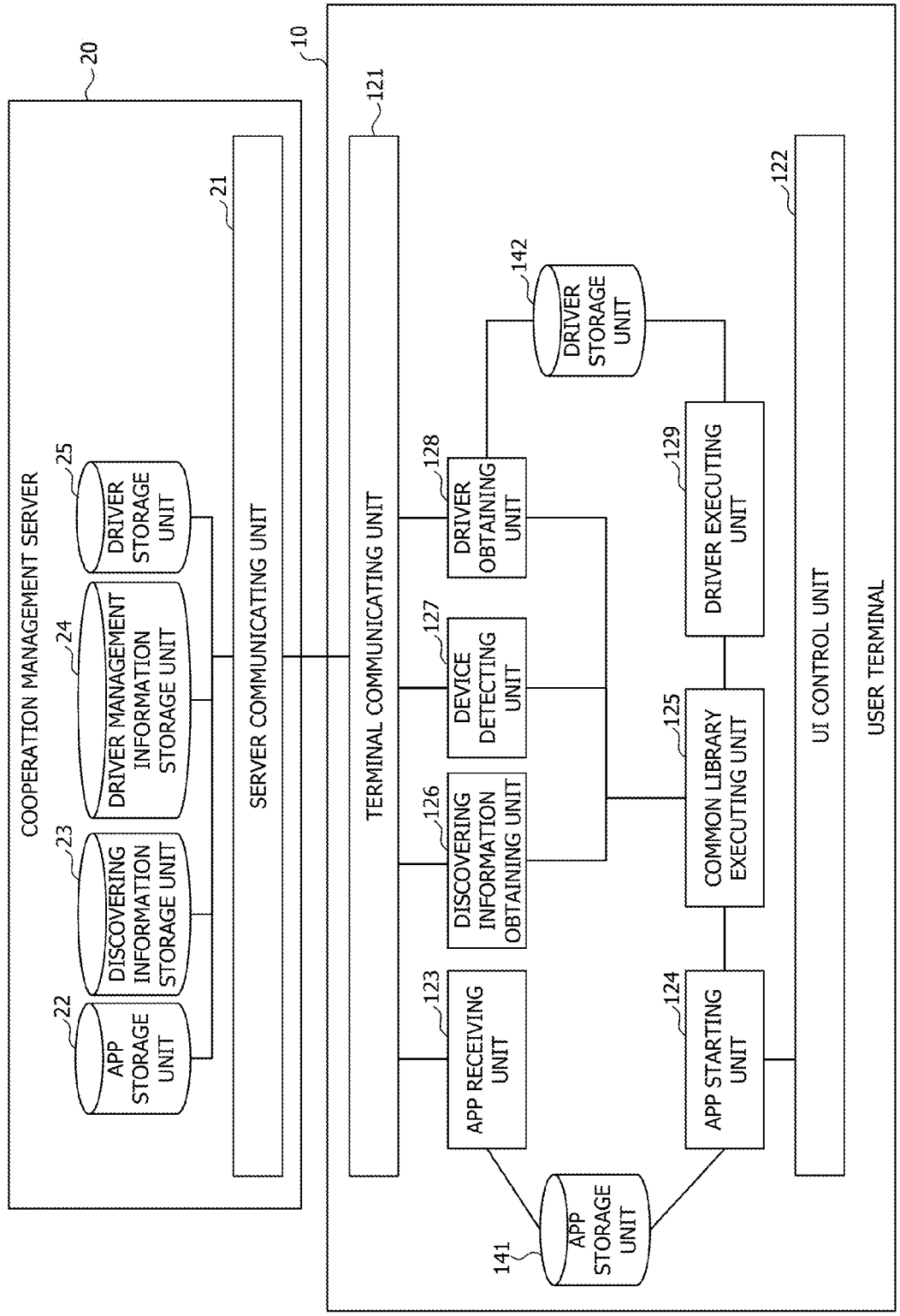
FIG. 3 is a diagram illustrating an example of functional configuration of a cooperation management server and the user terminal in the first embodiment.

FIG. 3 is a diagram illustrating an example of functional configuration of a cooperation management server and the user terminal in the first embodiment. The user terminal 10 in FIG. 3 includes a terminal communicating unit 121, a user interface (UI) control unit 122, an app receiving unit 123, an app starting unit 124, a common library executing unit 125, a discovering information obtaining unit 126, a device detecting unit 127, a driver obtaining unit 128, a driver executing unit 129, and the like. These units are implemented by processing that one or more programs installed in the user terminal 10 make the CPU 101 perform. The user terminal 10 also includes an app storage unit 141 and a driver storage unit 142 or the like. These storage units can be implemented by using the auxiliary storage device 103, for example.

The terminal communicating unit 121 controls radio communication by the user terminal 10. The UI control unit 122 performs display control for the Web app distributed from the cooperation management server 20 or the like. The app receiving unit 123 receives the Web app distributed from the cooperation management server 20. The received Web app is stored in the app storage unit 141. The app starting unit 124 starts the Web app received by the app receiving unit 123.

The common library executing unit 125 controls the execution of a common library attached to the Web app. A common library refers to a library common to a type based on the function and use of peripheral devices 30 or the like (which type will hereinafter be referred to as a "device type"). The Web app that intends to use a peripheral device 30 has attached thereto a common library corresponding to a device type to which the peripheral device 30 belongs. The common library includes definitions for making the user terminal 10 obtain, from the cooperation management server 20, the identifying information of each peripheral device 30 which identifying information may be necessary to detect (discover) each peripheral device 30 belonging to the device type that the common library corresponds via a radio communication (which identifying information will hereinafter be referred to as "discovering information"), detect (discover) a peripheral device 30 using the discovering information, and obtain a driver corresponding to the detected peripheral device 30, for example. The common library in the present embodiment is described in JavaScript (registered trademark) in consideration of compatibility with the Web app. Incidentally, the discovering information is for example a service set identifier (SSID), a media access control (MAC) address, or the like. In addition, the driver is a program (driver program) for making the user terminal 10 transmit a request from the Web app to the peripheral device 30. For example, the driver hides an API unique to the peripheral device 30, and provides a highly abstract API to a higher-level program (Web app in the present embodiment). For example a driver corresponding to a certain printer may provide a function (API) of print (url). The function is for example a function of printing content corresponding to a uniform resource locator (URL) specified in an argument url. In this case, the driver defines processing of downloading the content specified in the argument and processing for making the printer to which the driver corresponds print the content. Here, the processing for making the printer corresponding to the driver perform the printing is processing of calling an API unique to the printer, which API is disclosed by the printer. When the driver corresponding to each model of printer provides print (url), and a certain Web app includes such a script as calls print (url) in given timing (for example timing in which a button made to be displayed by the Web app is depressed), a degree of dependence of the Web app on a particular model of printer can be lowered. That is, the Web app can make a plurality of models of printers perform similar processing with the same source code by only replacing the driver. Incidentally, the function print (url) is merely illustrative. In addition, one driver may include a plurality of kinds of functions. Incidentally, the driver in the present embodiment is described in JavaScript (registered trademark).

The discovering information obtaining unit 126, the device detecting unit 127, the driver obtaining unit 128, and the driver executing unit 129 are implementation parts for APIs used in the common library. For example, in response to the calling of an API from the common library which API represents a request to obtain discovering information, the discovering information obtaining unit 126 obtains, from the cooperation management server 20, a list of discovering information related to peripheral devices 30 belonging to the device type expected to be used by the Web app received by the app receiving unit 123. Here, the discovering information of all of the peripheral devices 30 belonging to the device type is obtained regardless of whether or not the peripheral devices 30 can currently communicate with the user terminal 10. That is, the discovering information obtained by the discovering information obtaining unit 126 is the discovering information of the peripheral devices 30 as candidates for the transmission destination of a request from the Web app.

In response to the calling of an API from the common library which API represents a request to detect a peripheral device 30, the device detecting unit 127 detects a peripheral device 30 that the user terminal 10 can currently use (can communicate with), by using the discovering information obtained by the discovering information obtaining unit 126. In response to the calling of an API from the common library which API represents a request to obtain a driver, the driver obtaining unit 128 obtains the driver for the peripheral device 30 detected by the device detecting unit 127 from the cooperation management server 20. The obtained driver is stored in the driver storage unit 142. In response to the calling of an API that represents a request to execute the driver, the driver executing unit 129 executes the driver obtained by the driver obtaining unit 128.

The cooperation management server 20 includes a server communicating unit 21, an app storage unit 22, a discovering information storage unit 23, a driver management information storage unit 24, a driver storage unit 25, and the like.

The server communicating unit 21 controls communication with each user terminal 10, and performs processing requested by each user terminal 10. The app storage unit 22 stores Web apps in association with information indicating contexts. The discovering information storage unit 23 stores the discovering information of each peripheral device 30 installed within the company A, for example. The driver management information storage unit 24 stores, for each driver, a URL indicating a destination where the driver is stored. The driver storage unit 25 stores each driver.

Figure 4:
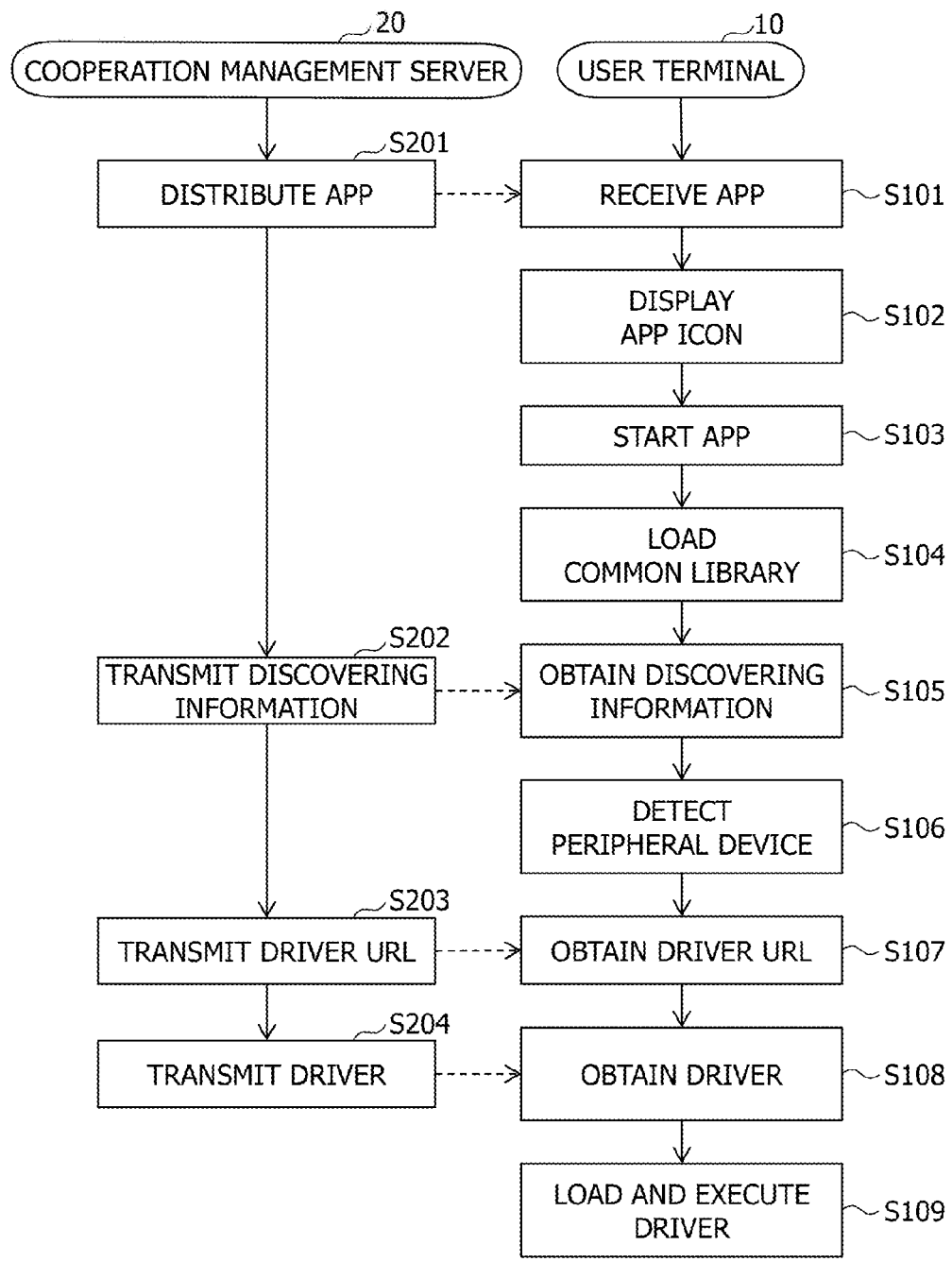
FIG. 4 is a diagram of assistance in explaining an example of a processing procedure performed by the user terminal and the cooperation management server in the first embodiment.

A processing procedure performed by the user terminal 10 and the cooperation management server 20 will be described in the following. FIG. 4 is a diagram of assistance in explaining an example of a processing procedure performed by the user terminal and the cooperation management server in the first embodiment.

In step S201, the server communicating unit 21 of the cooperation management server 20 obtains a Web app corresponding to the context of the user terminal 10 from the app storage unit 22, and distributes the obtained Web app to the user terminal 10.

A context that can be detected in the cooperation management server 20 and which context is common to each user terminal 10, such for example as a date and time or the like, may be detected by the cooperation management server 20. On the other hand, a context different for each user terminal 10 and difficult for other than the user terminal 10 to detect, such as the location of the user terminal 10 or the like, may be notified from the user terminal 10 to the cooperation management server 20. The location may be identified by latitude and longitude or the like, or may for example be identified on the basis of the SSID of an access point that the user terminal 10 can communicate with or the like.

Next, the app receiving unit 123 of the user terminal 10 receives the Web app distributed from the cooperation management server 20, and stores the received Web app in the app storage unit 141 (S101). The app receiving unit 123 may encrypt the Web app when storing the Web app in the app storage unit 141. Incidentally, the Web app is archived in an archive file, for example. The archive file includes therewithin an HTML file, a CSS file, a script file, an icon file, and the like.

Next, the UI control unit 122 displays an icon image represented by the icon file of the Web app received by the app receiving unit 123 on the display device 111 (S102).

Figure 5:
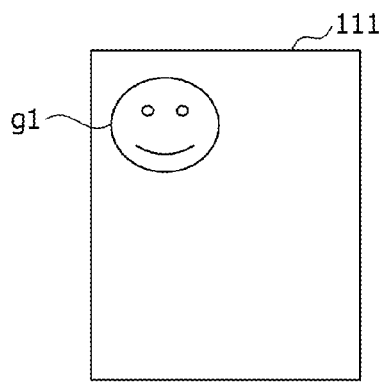
FIG. 5 is a diagram illustrating an example of display of an icon image in the first embodiment.

FIG. 5 is a diagram illustrating an example of display of an icon image in the first embodiment. FIG. 5 illustrates an example in which an icon image g1 of the Web app is displayed on a screen (for example a home screen) of the display device 111.

When an instruction to start the Web app is given by the user by operating the icon image g1, the app starting unit 124 starts the Web app (S103). In response to the starting of the Web app, the common library executing unit 125 loads a common library according to a definition within the HTML file of the Web app, and executes the common library (S104). Incidentally, the common library is for example one script file of one or more script files stored in the archive file of the Web app. However, the common library may be stored in the user terminal 10 in advance.

Figure 6:
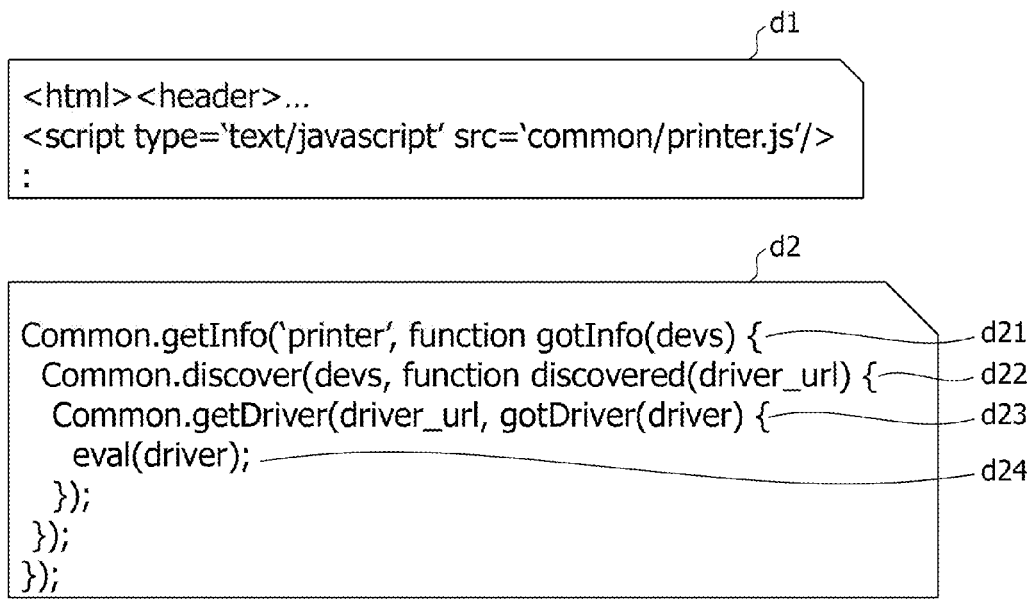
FIG. 6 is a diagram illustrating an example of definition contents of a hypertext markup language (HTML) file and a common library of a Web app in the first embodiment.

FIG. 6 is a diagram illustrating an example of definition contents of an HTML file and a common library of a Web app in the first embodiment. A definition d1 in FIG. 6 represents part of definitions within the HTML file of the Web app. The definition d1 indicates that a script having a file name "/common/printer.js" is to be executed (or is designated to be executed). The script is the common library.

A definition d2 is definition contents of the common library. A description d21, a description d22, a description d23, and a description d24 included in the definition d2 are each an API corresponding to the discovering information obtaining unit 126, the device detecting unit 127, the driver obtaining unit 128, or the driver executing unit 129.

For example, when the common library executing unit 125 detects a getInfo method in the description d21, the common library executing unit 125 calls the discovering information obtaining unit 126 corresponding to the method. The discovering information obtaining unit 126 obtains, from the cooperation management server 20, a list of discovering information related to peripheral devices 30 belonging to a device type ("printer" in the example of FIG. 6) specified in a first argument of the getInfo method (S105). For example, the discovering information obtaining unit 126 transmits a request to obtain discovering information, in which request the device type ("printer") is specified, to the cooperation management server 20. The server communicating unit 21 of the cooperation management server 20 identifies the discovering information of the peripheral devices 30 belonging to the specified device type by referring to the discovering information storage unit 23.

FIG. 7 is a diagram illustrating an example of configuration of a discovering information storage unit. As illustrated in FIG. 7, the discovering information storage unit 23 stores, in association with the device type, the discovering information of one or more peripheral devices 30 (namely, a peripheral device set) belonging to the device type. Each of the peripheral devices 30 is a peripheral device 30 installed in some place within the company A, for example. Incidentally, in FIG. 7, " . . . " indicates the discovering information related to one peripheral device 30. "," indicates a delimiter of each piece of discovering information.

When the server communicating unit 21 returns the list of the discovering information associated with the device type specified in the request to obtain the discovering information (S202), the discovering information obtaining unit 126 receives the list. Incidentally, the list is stored within a variable devs in the description d21.

Next, when the common library executing unit 125 detects a discover method in the description d22, the common library executing unit 125 calls the device detecting unit 127. In response to the call, the device detecting unit 127 performs steps S106 and S107. In step S106, the device detecting unit 127 performs processing of detecting (processing of discovering) peripheral devices 30 using each piece of discovering information (an SSID, a MAC address, or the like) stored in the variable devs specified in a first argument of the discover method (S106). Each piece of discovering information stored in the variable devs is the discovering information obtained in step S105. It suffices to perform the processing of detecting a peripheral device 30 using an SSID, a MAC address, or the like by utilizing a publicly known radio technology or the like. For example, when access to an SSID or a MAC address is attempted, and the access succeeds, it may be determined that a peripheral device 30 corresponding to the SSID or MAC address is detected. When the access fails, it may be determined that the peripheral device 30 corresponding to the SSID or MAC address is not detected. The processing of detecting peripheral devices 30 identifies peripheral devices 30 that can be used by the user terminal 10 at a present point in time. Incidentally, in the case of a peripheral device 30 supporting Wi-Fi (registered trademark) Direct, a Wi-Fi (registered trademark) SSID can be used as discovering information. In the case of a peripheral device 30 supporting BLE, a MAC address or a device name of the peripheral device 30 can be used as discovering information.

Next, for each detected peripheral device 30, the device detecting unit 127 obtains a URL indicating a destination where the driver for the peripheral device 30 is stored from the cooperation management server 20 on the basis of the discovering information of the peripheral device 30 (S107). For example, the device detecting unit 127 transmits a request to obtain the URL of the driver (which URL will hereinafter be referred to as the "driver URL") for the peripheral device 30, in which request the discovering information related to the detected peripheral device 30 is specified, to the cooperation management server 20. The server communicating unit 21 of the cooperation management server 20 obtains, from the driver management information storage unit 24, the driver URL corresponding to the discovering information specified in the obtaining request.

FIG. 8 is a diagram illustrating an example of configuration of a driver management information storage unit. As illustrated in FIG. 8, the driver management information storage unit 24 stores, in association with each piece of discovering information, the driver URL for the peripheral device 30 related to the discovering information. The discovering information is different for each of device bodies of the peripheral devices 30. The driver management information storage unit 24 therefore stores the driver URL for each of the device bodies of the peripheral devices 30. However, when a driver common to a plurality of peripheral devices 30 is valid, the common driver URL may be stored for the discovering information related to the plurality of peripheral devices 30.

When the server communicating unit 21 returns the driver URL associated with the discovering information specified in the request to obtain the driver URL (S203), the device detecting unit 127 receives the driver URL. Incidentally, a list of driver URLs received for respective pieces of discovering information is stored in a variable driver_url in the description d22.

Next, when the common library executing unit 125 detects a getDriver method in the description d23, the common library executing unit 125 calls the driver obtaining unit 128. The driver obtaining unit 128 obtains (downloads) the driver from the storage destination identified by the driver URL stored in the variable driver_url specified in a first argument of the getDriver method (S108). The driver URL stored in the variable driver_url is the driver URL obtained in step S107. For example, the driver obtaining unit 128 transmits a request to obtain the driver to the driver URL. The server communicating unit 21 of the cooperation management server 20 obtains the driver associated with the driver URL from the driver storage unit 25, and returns the obtained driver (S204). The driver obtaining unit 128 receives the driver. The received driver is stored in the driver storage unit 142. The identifier of the driver stored in the driver storage unit 142 (which identifier will hereinafter be referred to as the "driver name") is stored in a driver variable in the description d23. Incidentally, the driver obtaining unit 128 may encrypt the received driver, and store the driver in the driver storage unit 142. That is, the driver is stored after being encrypted separately from the Web app.

Next, when the common library executing unit 125 detects an eval method in the description d24, the common library executing unit 125 calls the driver executing unit 129. The driver executing unit 129 loads the driver identified by the driver name stored in the driver variable as an argument of the eval method from the driver storage unit 142 into the memory 102, and performs processing defined by the driver (S109). At this time, when the driver is stored in an encrypted state, the driver executing unit 129 decrypts the driver, and loads the driver into the memory 102.

By performing the processing defined by the driver, the Web app can use the peripheral device 30 communicable with the user terminal 10 at the present point in time via the driver.

Incidentally, it is difficult for a native application to dynamically change the driver to be loaded on the basis of a correspondence information storage unit 143. This is because a native application is distributed in an already compiled state and it is thus difficult to change the processing contents of the native application at a distribution destination. On the other hand, in the case of the Web app, the driver can be created in script language, and therefore the driver to be loaded can be changed dynamically.

Incidentally, the above description has been made of an example in which the common library includes different APIs (methods) for calling the functions of each of the discovering information obtaining unit 126, the device detecting unit 127, and the driver obtaining unit 128. However, an API for performing the respective functions of these units consecutively may be defined. In this case, the definition contents of the common library may be definition contents as illustrated in FIG. 9, for example.

Figure 9:
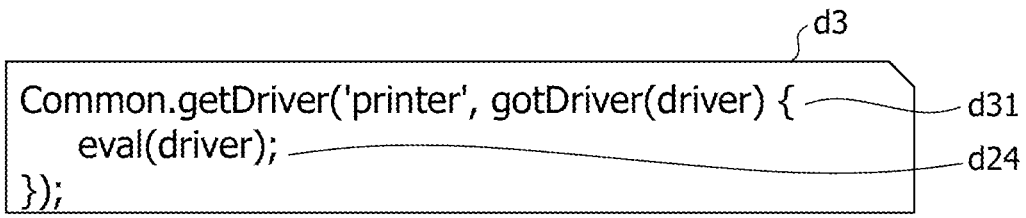
FIG. 9 is a diagram illustrating an example of second definition contents of a common library in the first embodiment.

FIG. 9 is a diagram illustrating an example of second definition contents of a common library in the first embodiment. In FIG. 9, the same parts as in FIG. 6 are identified by the same reference symbols, and description thereof will be omitted.

A definition d3 in FIG. 9 is an example of a second definition of the common library. A description d31 in the definition d3 is a method for consecutively performing the respective functions of the discovering information obtaining unit 126, the device detecting unit 127, and the driver obtaining unit 128. That is, when a getDriver method of the description d31 is called, steps S105 to S108 are performed. Thus, function units in which to distinguish each API usable in the common library may be determined as appropriate.

Incidentally, in the above description, an example has been illustrated in which one driver is prepared for one peripheral device 30. However, a plurality of kinds of drivers may be prepared for one peripheral device 30. A plurality of kinds of drivers corresponding to one peripheral device 30 are different from each other in terms of kinds and the number of APIs provided, for example. For example, a first driver provides a minimum of APIs (for example APIs related to monochrome single-side printing in the case where the peripheral device 30 is a printer) that may be necessary to use the peripheral device 30 while giving priority to the data size of the driver (reduction in an amount of consumption of the storage capacity of the user terminal 10). A second driver further provides APIs related to an advanced function (for example color printing, double-side printing, or the like). A third or subsequent driver providing APIs related to a further advanced function may be prepared.

In the case where a plurality of kinds of drivers are prepared for one peripheral device 30, the UI control unit 122 may display a menu for allowing the user to select a criterion for selecting a driver when the icon image g1 displayed in step S102 is operated, for example. Menu items are for example "prioritizing size," "prioritizing a function," and the like. In step S107, the device detecting unit 127 transmits, to the cooperation management server 20, a request to obtain a driver for the peripheral device 30 in which request discovering information related to the detected peripheral device 30 and a value corresponding to a menu item selected in the menu (which value will hereinafter be referred to as a "selection criterion") are specified. The server communicating unit 21 of the cooperation management server 20 obtains a driver URL corresponding to the discovering information and the selection criterion specified in the obtaining request from the driver management information storage unit 24. That is, in this case, the driver management information storage unit 24 of the cooperation management server 20 stores a driver URL in association with each piece of discovering information and each selection criterion.

As described above, according to the first embodiment, in response to the reception of a Web app, the user terminal 10 automatically downloads and executes a driver corresponding to a peripheral device 30 that the user terminal 10 can communicate with at the present point in time among peripheral devices 30 related to a device type that the Web app intends to use or cooperate with. In this case, an API unique to the peripheral device 30 is hidden by the driver. Hence, the Web app can cooperate with the peripheral device 30 by calling the function of the driver smoothed with respect to the model of the peripheral device 30 or the like. That is, even in the case of a peripheral device 30 with which the user terminal 10 as a distribution destination of a certain Web app happens to be able to communicate, a possibility that the peripheral device 30 can be used from the Web app can be increased. Thus, the present embodiment can improve flexibility related to cooperation between the Web app and the peripheral device 30.

In addition, according to the first embodiment, it is possible to reduce a necessity to store information indicating which driver may be necessary for each peripheral device 30 and the driver itself in the user terminal 10 in advance. It is therefore possible to suppress consumption of a storage capacity for storing such information and the driver itself in the user terminal 10.

A second embodiment will next be described. In the second embodiment, points different from the points of the first embodiment will be described. Points not particularly mentioned in the second embodiment may be similar to the points of the first embodiment.

In the first embodiment, description has been made of an example in which the detection of a peripheral device 30, the obtainment of a driver, and the like are performed in response to the starting of a Web app. In the second embodiment, description will be made of an example in which the detection of a peripheral device 30, the obtainment of a driver, and the like are performed before the starting of a Web app (that is, in response to the reception of a Web app) in a user terminal 10.

Figure 10:
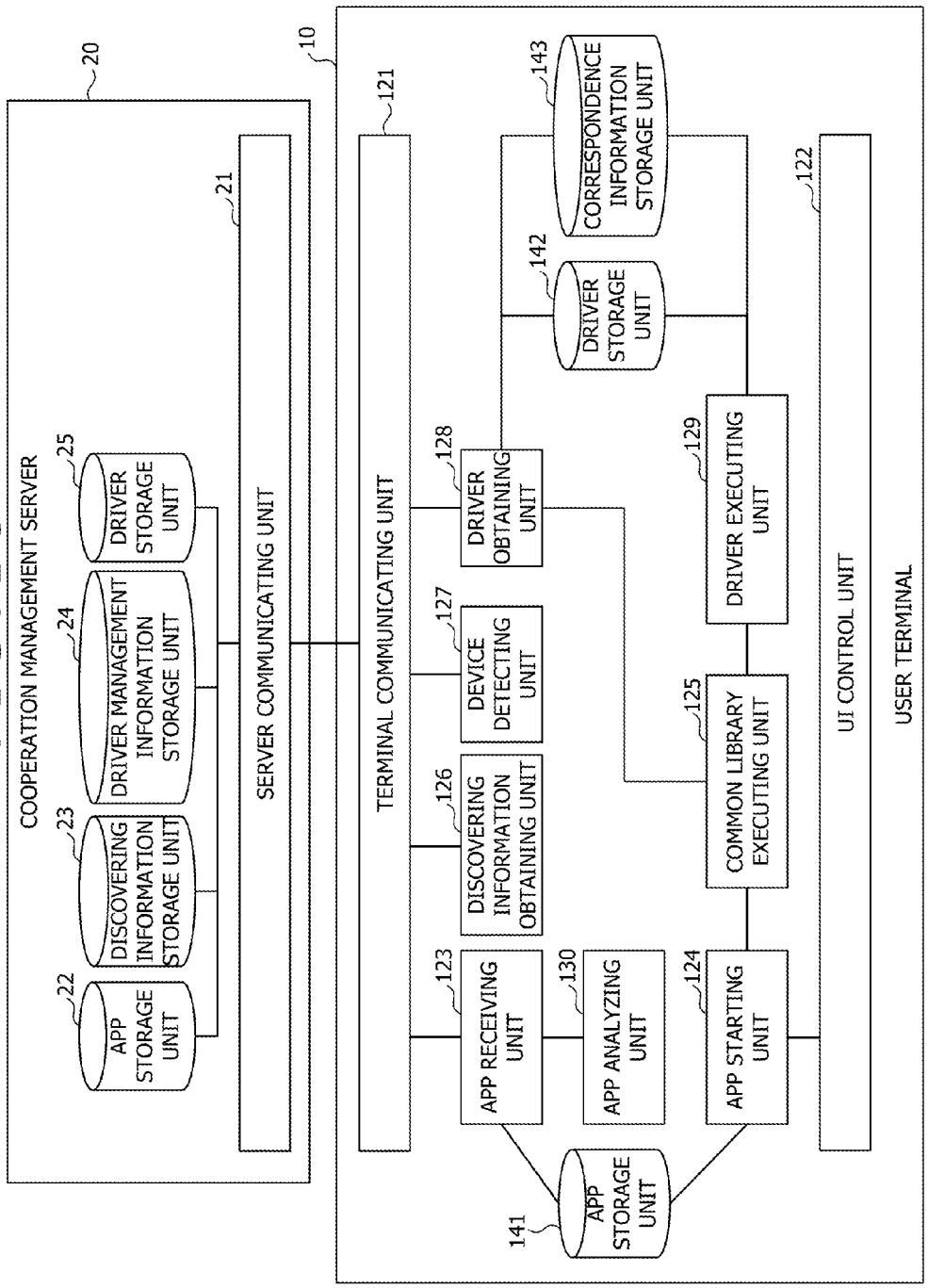
FIG. 10 is a diagram illustrating an example of functional configuration of a cooperation management server and a user terminal in a second embodiment.

FIG. 10 is a diagram illustrating an example of functional configuration of a cooperation management server and a user terminal in the second embodiment. In FIG. 10, parts identical or corresponding to the parts of FIG. 3 are identified by the same reference symbols, and description thereof will be omitted as appropriate. The user terminal 10 in FIG. 10 further includes an app analyzing unit 130 and a correspondence information storage unit 143.

The app analyzing unit 130 analyzes the definition contents (source code) of a Web app received by the app receiving unit 123, and identifies the device type of a peripheral device 30 that the Web app intends to use. Incidentally, the app analyzing unit 130 is implemented by processing that a program installed in the user terminal 10 makes the CPU 101 perform.

The correspondence information storage unit 143 stores correspondence information between the Web app received by the app receiving unit 123, a peripheral device 30 detected by the device detecting unit 127, and a driver obtained by the driver obtaining unit 128. The correspondence information storage unit 143 can be implemented by using the auxiliary storage device 103, for example.

Figure 11:
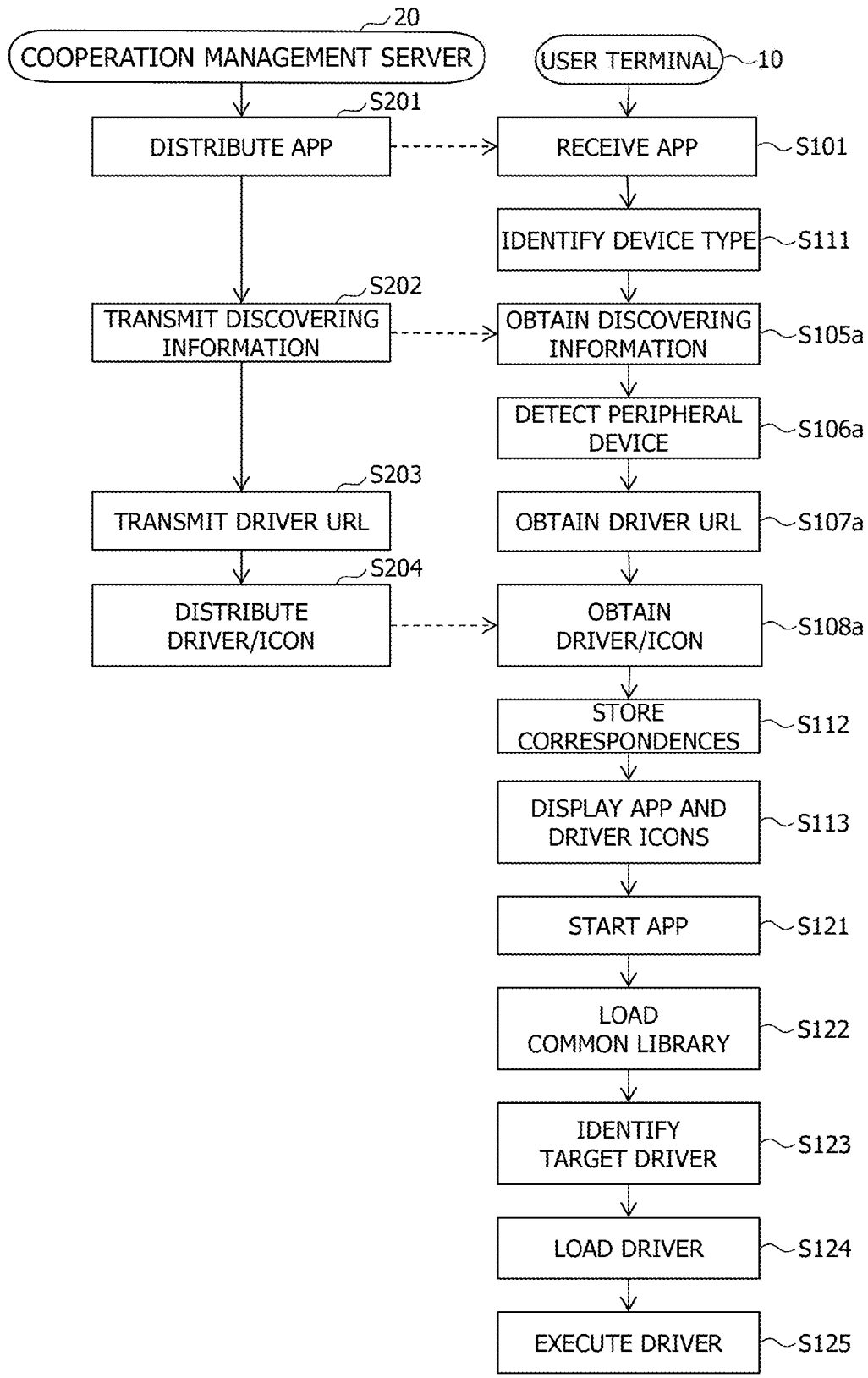
FIG. 11 is a diagram of assistance in explaining an example of a processing procedure performed by the user terminal and the cooperation management server in the second embodiment.

FIG. 11 is a diagram of assistance in explaining an example of a processing procedure performed by the user terminal and the cooperation management server in the second embodiment. In FIG. 11, the same steps as in FIG. 4 are identified by the same step numbers, and description thereof will be omitted.

When the app receiving unit 123 receives a Web app (S101), the app analyzing unit 130 analyzes the HTML file of the Web app, and identifies the device type of a peripheral device 30 that the Web app intends to use (S111). Definition contents of the HTML file of the Web app in the second embodiment may be similar to the definition contents of the first embodiment. However, suppose that in the second embodiment, the file name of the common library represents the device type. For example, "common/printer.js" is defined as the file path name of the common library in the definition d1 of FIG. 6. The app analyzing unit 130 identifies, as the device type, a character string "printer," which is obtained by removing an extension from a file name "printer.js" included in the file path name. Incidentally, such analysis is easy because the HTML file is text data. Alternatively, when the Web app is in a Packaged Web Apps format, the device type may be described in a Configuration Document. For example, the following description may be included within the Configuration Document. <feature name="http://example.org/device/printer"/>

In the present example, the analysis is even easier because the device type is represented by the URL.

The following steps S105*a* to S108*a* are basically processing similar to steps S105 to S108 in FIG. 4. However, the second embodiment is different from the first embodiment in that steps S105*a* to S108*a* are not the processing performed on the basis of the common library. That is, step S111 and steps S105*a* to S108*a* in the second embodiment are performed as given processing when the Web app is received. In other words, in the second embodiment, the discovering information obtaining unit 126, the device detecting unit 127, and the driver obtaining unit 128 perform steps S105*a* to S108*a* as given processing when the Web app is received rather than in response to the calling of methods defined in the common library. This is because, although the second embodiment performs the detection of a peripheral device 30, the obtainment of a driver, and the like before the execution of the Web app (in response to the reception of the Web app), it is difficult to execute the common library as a script constituting part of the Web app before the execution of the Web app.

Incidentally, in step S108*a*, an icon file of a driver may be received together with the driver. The icon file of the driver may be archived in an archive file together with the driver. In addition, as in step S108, the obtained driver may be stored in the driver storage unit 142 after being encrypted.

After step S108*a*, the driver obtaining unit 128 stores, in association with each other in the correspondence information storage unit 143, an app ID as the identifying information of the Web app received in step S101, a device ID as the identifying information of the peripheral device 30 detected in step S106*a*, the device type identified in step S111, and a driver name as the identifying information of the driver obtained in step S108*a* (S112).

FIG. 12 is a diagram illustrating an example of configuration of a correspondence information storage unit. As illustrated in FIG. 12, the correspondence information storage unit 143 stores the app ID, the device ID, the device type, and the driver name in association with each other. In this case, the app ID may be the file name of the Web app, for example. In addition, the device ID may be the same value as discovering information for the peripheral device 30 related to the device ID. The driver name may be the file name of the driver.

The correspondence information storage unit 143 also includes an item of a usage target. The item of the usage target is information indicating which peripheral device 30 is to be set as a usage target when a plurality of peripheral devices 30 are detected in relation to one Web app in step S106*a*. "Yes" denotes that the corresponding peripheral device 30 is a usage target. "No" denotes that the corresponding peripheral device 30 is not a usage target. As an example, a peripheral device 30 detected first may be automatically set as a usage target.

Next, the UI control unit 122 displays, on the display device 111, an icon image of the Web app received in step S101 and an icon image of the driver set as a usage target for the Web app (S113). The driver set as a usage target for the Web app is a driver whose value in the usage target item is "Yes" in a record related to the Web app in the correspondence information storage unit 143.

Figure 13:
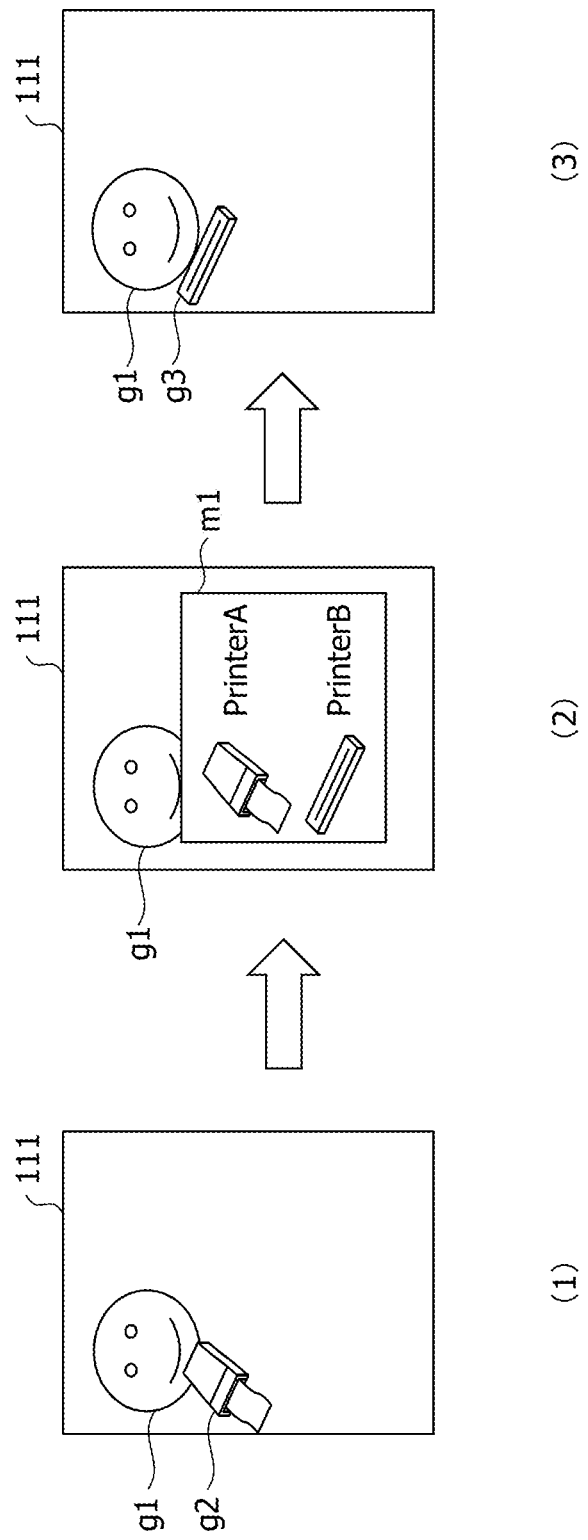
FIG. 13 is a diagram illustrating an example of display of icon images in the second embodiment.

FIG. 13 is a diagram illustrating an example of display of icon images in the second embodiment. In FIG. 13, the same parts as in FIG. 5 are identified by the same reference symbols.

In FIG. 13, (1) illustrates a state corresponding to step S113. In (1), an icon image g2 of the driver is displayed so as to be superimposed on an icon image g1 of the Web app.

Here, for example, in a case where a plurality of peripheral devices 30 are detected in relation to the same device type, when the icon image g2 superimposed on the icon image g1 is operated (touched), the UI control unit 122 displays a menu m1 including, as menu items, drivers associated with the Web app related to the icon image g1, as illustrated in (2). Incidentally, the drivers associated with the Web app refer to drivers whose driver names are stored in association with the app ID of the Web app in the correspondence information storage unit 143.

When one of the menu items is selected in the menu m1, the UI control unit 122 superimposes an icon image g3 corresponding to a driver related to the menu item on the icon image g1, as illustrated in (3). At this time, the UI control unit 122 sets the value of the usage target item for the driver corresponding to the icon g2 to "No" and sets the value of the usage target item for the driver corresponding to the icon g3 to "Yes" in the correspondence information storage unit 143.

The display of the icon image g1 in step S113 enables a user to use the Web app. Accordingly, when the user gives an instruction to start the Web app by operating the icon image g1, the app starting unit 124 starts the Web app (S121). In response to the starting of the Web app, the common library executing unit 125 loads a common library according to a definition d1 within the HTML file of the Web app, and executes the common library (S122).

FIG. 14 is a diagram illustrating an example of definition contents of a common library in the second embodiment. A definition d4 in FIG. 14 is an example of the definition contents of the common library. Incidentally, a getDriver method in a description d41 in FIG. 14 and the getDriver method in the description d31 in FIG. 9 are different from each other in implementation (processing performed in response to a call). That is, while the same method name is used for convenience in FIG. 9 and FIG. 14, these methods have mutually different functions.

When the common library executing unit 125 detects the getDriver method in the description d41 within the definition d4, the common library executing unit 125 calls the driver obtaining unit 128 corresponding to the method. The driver obtaining unit 128 identifies a driver to be loaded, by referring to the correspondence information storage unit 143 (S123). For example, a driver name whose value in the usage target item is "Yes" is identified among driver names stored in the correspondence information storage unit 143 in association with a combination of the app ID of the started Web app and the device type specified in a first argument of the method.

Next, the driver obtaining unit 128 loads a driver related to the identified driver name from the driver storage unit 142 into the memory 102 (S124). At this time, when the driver is stored in an encrypted state, the driver executing unit 129 decrypts the driver, and loads the driver into the memory 102. The driver name of the loaded driver is stored in a driver variable in the description d41. Incidentally, because the common library is part of the Web app, the driver obtaining unit 128 called from the common library can identify the app ID of the started Web app.

Next, when the common library executing unit 125 detects an eval method in a description d42, the common library executing unit 125 calls the driver executing unit 129. The driver executing unit 129 performs processing defined in the driver loaded into the memory 102 in step S124, the driver being identified by the driver name stored in the driver variable (S125). As a result, the Web app can use the peripheral device 30 that can communicate with the user terminal 10 at a present point in time.

As described above, the second embodiment can provide effects similar to the effects of the first embodiment by a configuration different from the configuration of the first embodiment and a processing procedure different from the processing procedure of the first embodiment.

A third embodiment will next be described. In the third embodiment, points different from the points of the second embodiment will be described. Points not particularly mentioned in the third embodiment may be similar to the points of the second embodiment.

In the third embodiment, the processing of detecting a peripheral device 30 is not performed immediately in response to the reception of a Web app. That is, the second embodiment assumes a case where a peripheral device 30 is used on the spot where the Web app is received. Therefore, in the second embodiment, an example has been described in which the processing of detecting a peripheral device 30 is performed in response to the reception of the Web app. However, there may be for example a case where the Web app is received at an office, and the Web app and the peripheral device 30 are desired to be made to cooperate with each other at a place different from the office. For example, there may be a case where the user desires to perform printing by using the Web app at a destination of a business trip but the cooperation management server 20 and the user terminal 10 may not communicate with each other at the destination of the business trip.

In such a case, it suffices to perform other than step S106*a* among steps S101 to S113 in FIG. 11 in an environment in which communication with the cooperation management server 20 is possible, such as an office or the like. In steps S107*a* and S108*a*, drivers corresponding to all of the peripheral devices 30 belonging to the device type identified in step S111 may be obtained, or drivers corresponding to part of the peripheral devices 30 may be obtained. For example, a driver to be downloaded may be selected by the user from among the drivers related to all of the peripheral devices 30 belonging to the device type. It suffices for the user to select a driver that is highly likely to support a printer at the destination of the business trip. Hence, at a time of an end of step S113 in the third embodiment, the device type, a device ID, a driver name, and the like related to each of all or part of the peripheral devices 30 belonging to the device type that the Web app received at the office intends to use are stored in the correspondence information storage unit 143 in association with the app ID of the Web app.

When the user starts the Web app at the destination of the business trip, step S121 and subsequent steps in FIG. 11 are performed. At this time, for example, steps S107*a* and S108*a* may be performed following step S122. In order to realize such a processing procedure, a common library may be defined as illustrated in FIG. 15, for example.

FIG. 15 is a diagram illustrating an example of definition contents of a common library in the third embodiment. In a definition d5, a description d51 corresponds to step S106*a*, a description d52 corresponds to steps S123 and S124, and a description d53 corresponds to step S125.

For example, when the common library executing unit 125 detects a discover method in the description d51, the common library executing unit 125 calls the device detecting unit 127 corresponding to the method. The device detecting unit 127 performs processing of detecting a peripheral device 30 corresponding to the device type identified by "printer" specified in a first argument of the discover method. The device ID of the detected peripheral device 30 is stored in device_id in the description d51.

Next, when the common library executing unit 125 detects a getDriver method in the description d52, the common library executing unit 125 calls the driver obtaining unit 128 corresponding to the method. The driver obtaining unit 128 identifies a driver name corresponding to the device ID specified in a first argument of the getDriver method and the app ID of the started Web app, by referring to the correspondence information storage unit 143 (FIG. 12). The driver obtaining unit 128 loads a driver related to the driver name from the driver storage unit 142 into the memory 102. The driver name is stored in a variable driver.

Next, processing similar to step S125 in FIG. 11 is performed on the basis of the description d53.

As described above, according to the third embodiment, even when a period during which the user terminal 10 receives the Web app and a period during which the user terminal 10 detects a peripheral device 30 are different from each other, cooperation between the Web app and the peripheral device 30 can be realized.

Incidentally, in each of the foregoing embodiments, description has been made of an example in which a Web app and a driver are distributed separately from each other. However, a Web app and a driver may be distributed integrally with each other. For example, the driver may be distributed in a state of being included within the same archive file as the Web app. In this case, the cooperation management server 20 may estimate a driver corresponding to the context (location or the like) of the user terminal 10, and attach the driver to the Web app distributed according to the context. In this case, a plurality of drivers corresponding to a plurality of respective peripheral devices 30 may be attached to the Web app. It suffices to load and execute a driver corresponding to a detected peripheral device 30 on the side of the user terminal 10.

In addition, each of the foregoing embodiments may be applied to application programs other than Web apps.

Incidentally, in each of the foregoing embodiments, the user terminal 10 is an example of an information processing terminal. The peripheral device 30 is an example of an external device. The app receiving unit 123 is an example of a receiving unit. The device detecting unit 127 is an example of a detecting unit. The driver obtaining unit 128 is an example of an obtaining unit. The driver executing unit 129 is an example of an executing unit.

Embodiments of the present technology have been described above in detail. However, the present technology is not limited to such particular embodiments, but is susceptible of various modifications and changes within the scope of the spirit of the present technology as described in claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing method comprising:
   starting, by an information processing device, an application program designating a peripheral device type of a plurality of peripheral device types, each of the plurality of peripheral device types corresponding to each peripheral device set, the application program utilizing a specified peripheral device included in a specified peripheral device set to which the designated peripheral device type corresponds;
   obtaining each of identifiers of each peripheral device included in the specified peripheral device set based on the designated peripheral device type;
   detecting at least one peripheral device that is configured to cooperate with the information processing device;
   determining the specified peripheral device of the designated peripheral device type, from among the detected at least one peripheral device; and
   obtaining a specified driver program for utilizing the determined specified peripheral device,
   wherein the application program utilizes the determined specified peripheral device based on the obtained specified driver program, and the detecting is performed based on the obtained identifiers.

2. The information processing method according to claim 1, wherein
   the application program calls a specified common program commonly provided for the specified peripheral device set to which the designated peripheral device type corresponds, and
   the specified common program performs the detecting, the determining, and the obtaining of the specified driver program.

3. The information processing method according to claim 1, wherein
   the application program calls a specified common program commonly provided for the specified peripheral device set to which the designated peripheral device type corresponds, and
   the specified common program performs the detecting, the determining, the obtaining of the specified driver program, and the obtaining of each of the identifiers.

4. The information processing method according to claim 1, wherein
   the specified driver program calls a specified application program interface (API) uniquely provided for the determined specified peripheral device.

5. The information processing method according to claim 1, wherein
   the information processing device obtains the application program from a server apparatus based on a context of the information processing device.

6. The information processing method according to claim 5, further comprising:
   obtaining each of identifiers of each peripheral device included in the specified peripheral device set based on the designated peripheral device type, from the server apparatus,
   wherein the detecting is performed based on the obtained identifiers.

7. The information processing method according to claim 6, wherein
   the information processing device obtains the specified driver program for utilizing the determined specified peripheral device from the server apparatus.

8. The information processing method according to claim 7, wherein
   the starting of the application program is performed before the obtaining of each of the identifiers and the obtaining of the specified driver program.

9. The information processing method according to claim 7, wherein
   the starting of the application program is performed after the obtaining of each of the identifiers and the obtaining of the specified driver program.

10. The information processing method according to claim 6, wherein
    the information processing device obtains a plurality of driver programs for utilizing a plurality of peripheral devices respectively from the server apparatus before the starting of the application program, and
    the specified driver program for utilizing the determined specified peripheral device is obtained from the plurality of driver programs.

11. An information processing device comprising:
    a memory;
    a processor coupled to the memory and configured:
    start an application program designating a peripheral device type of a plurality of peripheral device types, each of the plurality of peripheral device types corresponding to each peripheral device set, the application program utilizing a specified peripheral device included in a specified peripheral device set to which the designated peripheral device type corresponds,
    obtain a specified driver program for utilizing the determined specified peripheral device each of identifiers of each peripheral device included in the specified peripheral device set based on the designated peripheral device type,
    detect at least one peripheral device that is configured to cooperate with the information processing device,
    determine the specified peripheral device of the designated peripheral device type, from among the detected at least one peripheral device, and
    obtain a specified driver program for utilizing the determined specified peripheral device, wherein the application program utilizes the determined specified peripheral device based on the obtained specified driver program, and the detecting is performed based on the obtained identifiers.

12. A non-transitory computer-readable storage medium storing a program that causes an information processing device to execute a process, the information processing device including a memory, the process comprising:

starting an application program designating a peripheral device type of a plurality of peripheral device types, each of the plurality of peripheral device types corresponding to each peripheral device set, the application program utilizing a specified peripheral device included in a specified peripheral device set to which the designated peripheral device type corresponds;

obtaining each of identifiers of each peripheral device included in the specified peripheral device set based on the designated peripheral device type;

detecting at least one peripheral device that is configured to cooperate with the information processing device;

determining the specified peripheral device of the designated peripheral device type, from among the detected at least one peripheral device; and obtaining a specified driver program for utilizing the determined specified peripheral device, wherein the application program utilizes the determined specified peripheral device based on the obtained specified driver program, and the detecting is performed based on the obtained identifiers.

* * * * *